(12) United States Patent
Iemura

(10) Patent No.: US 9,518,515 B2
(45) Date of Patent: Dec. 13, 2016

(54) SLIDING MODE CONTROLLER AND INTERNAL COMBUSTION ENGINE SYSTEM CONTROL DEVICE

(75) Inventor: Akiyuki Iemura, Gotenba (JP)

(73) Assignee: TOYOTA JIDOSHA KABUSHIKI KAISHA, Aichi (JP)

(*) Notice: Subject to any disclaimer, the term of this patent is extended or adjusted under 35 U.S.C. 154(b) by 406 days.

(21) Appl. No.: 14/237,789

(22) PCT Filed: Aug. 9, 2011

(86) PCT No.: PCT/JP2011/068099
§ 371 (c)(1),
(2), (4) Date: Feb. 7, 2014

(87) PCT Pub. No.: WO2013/021453
PCT Pub. Date: Feb. 14, 2013

(65) Prior Publication Data
US 2014/0207361 A1    Jul. 24, 2014

(51) Int. Cl.
*G05B 13/00* (2006.01)
*F02D 28/00* (2006.01)
*F02D 41/00* (2006.01)
*F02D 41/14* (2006.01)
*F02B 29/04* (2006.01)

(52) U.S. Cl.
CPC ........... *F02D 28/00* (2013.01); *F02D 41/0065* (2013.01); *F02D 41/1403* (2013.01); *F02M 26/05* (2016.02); *G05B 13/00* (2013.01); *F02B 29/0406* (2013.01); *F02M 26/23* (2016.02); *Y02T 10/47* (2013.01)

(58) Field of Classification Search
CPC .............. F02D 41/1401; F02D 41/1402; F02D 41/1403; F02D 28/00; F02D 14/0065; G05B 13/00
USPC .................................. 123/480; 701/101, 102
See application file for complete search history.

(56) References Cited

U.S. PATENT DOCUMENTS

| | | | | |
|---|---|---|---|---|
| 5,371,669 A | * | 12/1994 | Venkataraman | ..... G05B 13/047 700/261 |
| 5,845,490 A | | 12/1998 | Yasui et al. | |
| 5,845,491 A | | 12/1998 | Yasui et al. | |
| 5,852,930 A | | 12/1998 | Yasui et al. | |
| 6,266,605 B1 | * | 7/2001 | Yasui | ................. G05B 13/0255 60/276 |
| 6,431,131 B1 | * | 8/2002 | Hosoya | ................... F01L 1/022 123/90.15 |

(Continued)

FOREIGN PATENT DOCUMENTS

| JP | 3261038 B2 | 12/2001 |
|---|---|---|
| JP | 3261059 B2 | 12/2001 |

(Continued)

*Primary Examiner* — Thomas Moulis
(74) *Attorney, Agent, or Firm* — Sughrue Mion, PLLC

(57) ABSTRACT

The invention relates to a sliding mode controller for controlling a controlled object system by using the adaptive sliding mode control. Also, the invention relates to an internal combustion engine system control device for controlling an internal combustion engine system by using the adaptive sliding mode control. The invention is characterized by comprising adaptive law input term learning means for learning an adaptive law input term so as to transfer an offset of a reaching law input term in the adaptive sliding mode control to the adaptive law input term.

5 Claims, 5 Drawing Sheets

(56) References Cited

U.S. PATENT DOCUMENTS

| | | | |
|---|---|---|---|
| 6,611,823 B1* | 8/2003 | Selmic | G05B 13/027 700/44 |
| 7,813,867 B2 | 10/2010 | Yasui et al. | |
| 2003/0094151 A1 | 5/2003 | Yasui | |
| 2003/0101975 A1* | 6/2003 | Yoshizawa | F02D 41/1403 123/674 |
| 2004/0059491 A1 | 3/2004 | Yoneda et al. | |
| 2009/0043547 A1* | 2/2009 | Kirby | G06F 17/175 703/2 |
| 2009/0164090 A1* | 6/2009 | Yasui | F02D 41/1403 701/102 |
| 2013/0092785 A1* | 4/2013 | Tournes | F41G 7/22 244/3.2 |

FOREIGN PATENT DOCUMENTS

| | | |
|---|---|---|
| JP | 3819257 B2 | 6/2006 |
| JP | 4145520 B2 | 6/2008 |
| JP | 4263448 B2 | 2/2009 |
| JP | 2010-229974 A | 10/2010 |

* cited by examiner

SLIDING MODE CONTROLLER AND INTERNAL COMBUSTION ENGINE SYSTEM CONTROL DEVICE

CROSS REFERENCE TO RELATED APPLICATIONS

This is a National Stage of International Application No. PCT/JP2011/068099 filed Aug. 9, 2011, the contents of which are incorporated herein by reference in their entirety.

TECHNICAL FIELD

The invention relates to a sliding mode controller for controlling a controlled object system by using an adaptive sliding mode control. Also, the invention relates to an internal combustion engine system control device for controlling an internal combustion engine system (including an internal combustion engine and devices installed on the engine) by using the adaptive sliding mode control.

BACKGROUND ART

Conventionally, the sliding mode control has been widely applied to various systems. The sliding mode control is a variable structure type feedback control technique for previously structuring a hyperplane (a switching hyperplane) expressed by a switching function, then, converging a state variable of a controlled object on the hyperplane by a reaching law input (a reaching mode) and then, converging the state variable on a predetermined point by an equivalent control input while constraining the state variable on the hyperplane (a sliding mode). The switching function is a linear function which includes the state variable of the controlled object as a variable.

In this sliding mode control, once the state variable is converged on the hyperplane, the state variable is stably converged on a predetermined equilibrium point (converging point) on the hyperplane while the state variable is affected by the little disturbance, etc. Of course, the state variable is affected by the disturbance, etc. until the state variable is converged on the hyperplane (that is, in the reaching mode).

Conventionally, the adaptive sliding mode control has been widely applied to the various systems. The adaptive sliding mode control uses an adaptive law input (an input depending on the time integration of the switching function) in addition to the reaching law input in the normal sliding mode control in order to converge the state variable on the hyperplane. This usage of the adaptive law input substantially corresponds to the movement of the hyperplane itself. By using such an adaptive sliding mode control, the convergence of the state variable on a target value can be realized with high stability.

The sliding mode control and the adaptive sliding mode control are well known and for example, are described in detail in "SLIDING MODE CONTROL—DESIGN THEORY OF NON-LINEAR ROBUST CONTROL" attributed to KENZO NONAMI and KOKI DEN (CORONA PUBLISHING CO., LTD. 1994). Regarding the examples of the application of the adaptive sliding mode control to the control of an internal combustion engine system including a vehicle (for example, an air-fuel ratio control, an EGR control, a valve train control, a braking control, transmission control, etc.), for example, refer to the JP Examined Patent Publication No. 3261038 (the JP Unexamined Patent Publication No. 9-273440), the JP Examined Patent Publication No. 3261059 (the JP Unexamined Patent Publication No. 9-324681), the JP Examined Patent Publication No. 3819257 (the JP Unexamined Patent Publication No. 2002-364430), the JP Examined Patent Publication No. 4145520 (the JP Unexamined Patent Publication No. 2003-155938), the JP Examined Patent Publication No. 4263448 (the JP Unexamined Patent Publication No. 2004-114764), U.S. Pat. No. 5,845,491, and U.S. Pat. No. 7,813,867, etc.

CITATION LIST

Patent Literature

[Patent Literature 1]
  JP Examined Patent Publication No. 3261038 (JP Unexamined Patent Publication No. 9-273440)
[Patent Literature 2]
  JP Examined Patent Publication No. 3261059 (JP Unexamined Patent Publication No. 9-324681)
[Patent Literature 3]
  JP Examined Patent Publication No. 3819257 (JP Unexamined Patent Publication No. 2002-364430)
[Patent Literature 4]
  JP Examined Patent Publication No. 4145520 (JP Unexamined Patent Publication No. 2003-155938)
[Patent Literature 5]
  JP Examined Patent Publication No. 4263448 (JP Unexamined Patent Publication No. 2004-114764)
[Patent Literature 6]
  U.S. Pat. No. 5,845,491
[Patent Literature 7]
  U.S. Pat. No. 7,813,867

SUMMARY OF INVENTION

In this type of the conventional devices, the deviation of the eventual convergence value of the state variable derived from the individual difference, etc of the system is absorbed in the adaptive law input term. Thus, the convergence speed of the state variable on the hyperplane differs, depending on the system. Therefore, this type of the conventional device has a room for improvement regarding the followability of the state variable to the target value. This invention is directed to solve such a problem.

This invention is characterized by comprising adaptive law input term learning means for learning an adaptive law input term so as to transfer an offset of a reaching law input term in the adaptive sliding mode control to an adaptive law input term.

In the device of the invention comprising such a constitution, when the offset occurs in the reaching law input term due to the individual difference, etc of the system, the offset is transferred (or switched or shifted) to the adaptive law input term. Thereby, the vibrational movement of the reaching law input term is constrained as much as possible and thus, the vibrational movement of the controlled object system (the internal combustion engine system, etc.) is restricted as much as possible. Therefore, according to this invention, the high followability of the state variable, which is a controlled object variable in the controlled object system (as the concrete variable in the internal combustion engine system, a turbocharging pressure, etc.), to the target value can be obtained.

The adaptive law input term learning means may learn the adaptive law input term every an operation area of the controlled object system (as the concrete example in the internal combustion engine system, the engine speed, the engine load, etc.). Thereby, even when the influence of the individual difference of the system changes along with the change of the operation state of the controlled object system, the high followability of the state variable to the target value can be obtained.

In particular, an adaptive law input term learning map may be provided, depending on parameters expressing the state of the controlled object system, which are different from the parameter defining the operation area (as the concrete example in the internal combustion engine system, the cooling water temperature, the ambient temperature, etc.). In this case, the adaptive law input term is learned by updating the respective adaptive law input term learning map, depending on the operation areas.

In the case that the parameters correspond to correction values for the control target in the controlled object system, the adaptive law input term learning means may transfer the offset to the adaptive law input term learning map, depending on the magnitude relationship between the correction values. That is, as the concrete example in the internal combustion engine system, for example, in the case that the target value of the EGR rate is corrected, depending on the cooling water temperature, the ambient temperature and the ambient pressure (refer to the JP Unexamined Patent Publication No. 2000-2122, etc.), the adaptive law input term learning means may adjust (distribute) the offset to an adaptive law input term learning map for a base cooling water temperature, an adaptive law input term learning map for a base ambient temperature and an adaptive law input term learning map for a base ambient pressure, depending on the magnitude relationship between a cooling water temperature correction value, an ambient temperature correction value and an ambient pressure correction value relative to the target EGR rate (for example, a ratio of deviations relative to a value at a base state). Thereby, even in the case that a command state (a command value) relative to the various manipulated objects provided in the controlled object system under the stationary state changes, the high followability of the state variable to the target value can be obtained.

MODE FOR CARRYING OUT THE INVENTION

Figure 1:
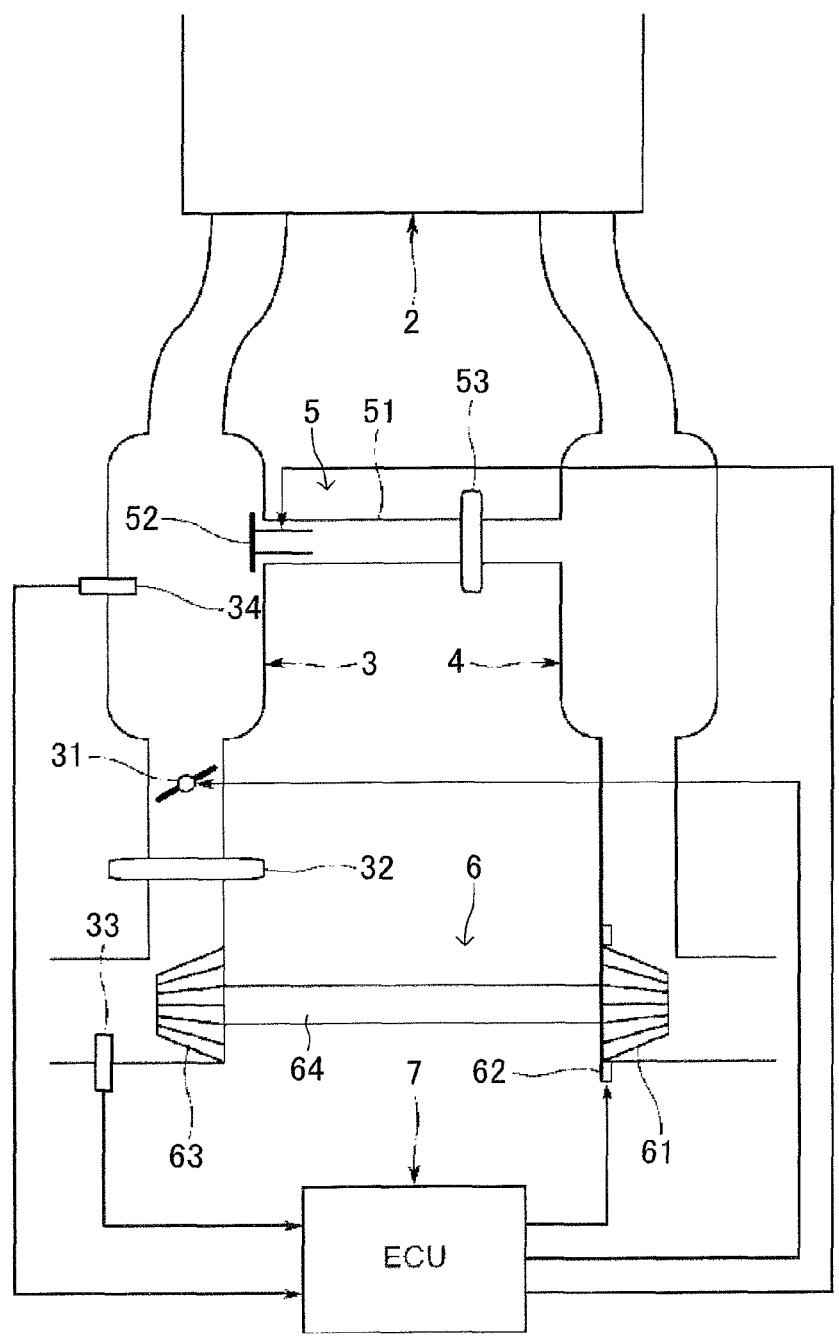
FIG. 1 is a view showing a general constitution of an internal combustion engine system which is a controlled object system which one embodiment of this invention is applied.

Below, an embodiment of this invention will be described, referring to the drawings. It should be noted that various changes (modifications), which may apply to the embodiment, are described in the last part of this description, since the consistent understanding of the description of the embodiment may be interfered if the changes are described in the description of the embodiment.

[Constitution]

FIG. 1 is a view showing a general constitution of an internal combustion engine system 1, which is a controlled object system which one embodiment of this invention is applied. In this embodiment, the internal combustion engine system 1 comprises an internal combustion engine 2, intake and exhaust systems 3 and 4 connected to the engine 2, an EGR system 5 provided between the intake and exhaust systems 3 and 4 (EGR stands for "Exhaust Gas Recirculation") and a turbocharger 6. A control unit 7 of this embodiment is provided so as to control an operation of the system 1.

Accessories or the like such as a throttle valve 31, an intercooler 32, etc. and various sensors or the like such as sensors 33 and 34, etc. for detecting an EGR rate, a turbocharging pressure (a pressure in an intake pipe), etc. are provided in the intake system 3. Also, the accessories or the like such as an exhaust gas purification device (a catalyst) not shown, etc. and the sensors or the like are provided in the exhaust system 4.

The EGR system 5 has an EGR passage 51, an EGR valve and an EGR cooler 53. The EGR passage 51 is provided to connect the exhaust system 4 on the engine 2 side of a turbine 61 described later (upstream side in the exhaust gas flowing direction) to the intake system 3 on the engine 2 side of the throttle valve 31 (downstream side in the intake air flowing direction). The EGR valve 52 is provided in the EGR passage 51 so as to control a flowing state of the exhaust gas in the EGR passage 51 (an introduction amount of the exhaust gas, which is discharged from the engine 2, to the intake system 3). The EGR cooler 53 is provided in the EGR passage 51 so as to cool the exhaust gas flowing through the EGR passage 51.

The turbocharger 6 has a turbine 61, nozzle vanes 62, a compressor 63 and a shaft 64. The turbine 61 is provided on the engine 2 side of the aforementioned exhaust gas purification device not shown provided in the exhaust system 4 (upstream side in the exhaust gas flowing direction). The turbocharger 6 of this embodiment is a variable nozzle turbocharger and the nozzle vanes 62 are provided, opposed to the turbine 61 so as to vary the flow rate of the exhaust gas, which blows into the turbine 61. The compressor 63 is provided upstream of the throttle valve 31 and the intercooler 32 provided in the intake system 3 in the intake air flowing direction. The turbine 61 and the compressor 63 are connected to each other by the shaft 64.

The control unit 7 (hereinafter, will be referred to as—ECU 7—) is a microcomputer, which has a processor (CPU: Central Processing Unit), a RAM (Random Access Memory), a ROM (Read Only Memory), a flash memory (a rewritable non-volatile memory), an A/D converter circuit, a D/A converter circuit, etc. The ECU 7 is electrically connected to the aforementioned various sensors or the like for acquiring various parameters such as the EGR rate, the turbocharging pressure (the pressure in the intake pipe), an engine speed, an acceleration pedal manipulation amount, the cooling water temperature, an intake air temperature, the ambient temperature, the ambient pressure, etc. Also, the ECU 7 is electrically connected to a manipulated part (also may be referred to as an operated part or a manipulated object) such as the throttle valve 31, the EGR valve 52, the nozzle vanes 62, etc. for controlling the operation state of the internal combustion engine system 1.

The ECU 7, which is an embodiment of the sliding mode controller and the internal combustion engine system control device of this invention, is configured to make the CPU read a routine (program), a table (map), etc. previously stored in the ROM and perform the routine to control the operation of the aforementioned manipulated part on the basis of the various parameters acquired by the aforementioned various sensors or the like. In particular, in this embodiment, the ECU 7 is configured to control the EGR rate and the turbocharging pressure (the pressure in the intake pipe) by using the adaptive sliding mode control.

Figure 2:
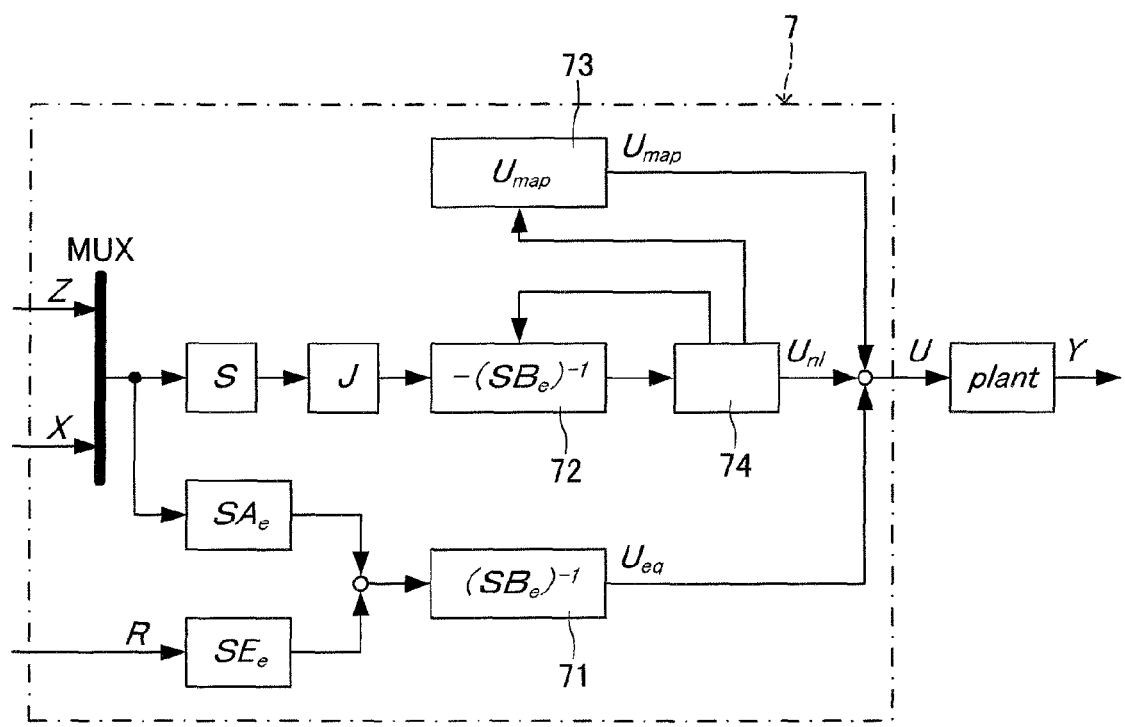
FIG. 2 is a block diagram view of a control unit which is the embodiment of this invention shown in FIG. 1.

FIG. 2 is a block diagram view of the ECU 7 shown in FIG. 1. As shown in FIG. 2, the ECU 7 has an equivalent control input term generation part 71, a reaching law input term generation part 72, an adaptive law input term generation part 73 and an adaptive law input term learning part 74.

The equivalent control input term generation part 71 is configured to generate an equivalent control input term (which may be referred to as a linear input term or a linear term) $U_{eq}$, which is one of control inputs U to be given to the manipulated part. The reaching law input term generation part 72 is configured to generate a reaching law input term (which may be referred to as non-linear input term or a non-linear term) $U_{nl}$, which is one of the control inputs U. The adaptive law input term generation part 73 is configured to generate an adaptive law input term (which may be referred to as an adaptive term) $U_{map}$, which is one of the control inputs U. The adaptive law input term learning part 74 is configured to learn the adaptive law input term $U_{map}$ by transferring an offset of the reaching law input term $U_{nl}$ to the adaptive law input term $U_{map}$.

[Summary of Operation]

Below, the summary of the operation of the ECU 7 of this embodiment will be described by using FIGS. 1 and 2 and as necessary, mathematical expressions.

The ECU 7 determines a required fuel injection amount on the basis of the various parameters acquired by the aforementioned sensors or the like. Next, the ECU 7 sets a target EGR rate and a target turbocharging pressure at least on the basis of the engine speed and the required fuel injection amount. A map data, which shows each target value to be set, depending on the engine speed and the required fuel injection amount, is previously stored in the ROM or the flash memory of the ECU 7. The ECU 7 searches the map by using the engine speed and the required fuel injection amount as keys and acquires the target values of the EGR rate and the turbocharging pressure.

Thereafter, the ECU 7 acquires (detects) the present value of the EGR rate and the turbocharging pressure on the basis of signals output from the sensors 33 and 34. Then, the ECU 7 calculates manipulated amounts (opening degrees) of the EGR valve 52, the nozzle vanes 62 and throttle valve 31 from the deviation between the present and target values of each controlled amount and inputs driving signals each corresponding to the manipulated amount to the manipulated parts to control the EGR rate and the turbocharging pressure.

Figure 3:
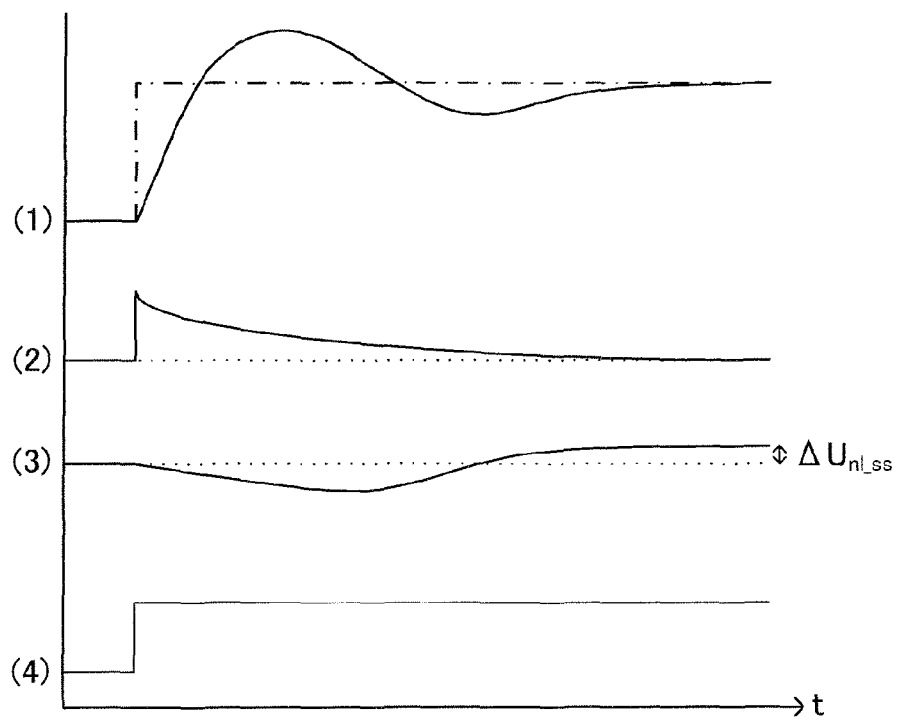
FIG. 3 is a time chart for describing a brief summary of an activation of the embodiment.
Figure 3:
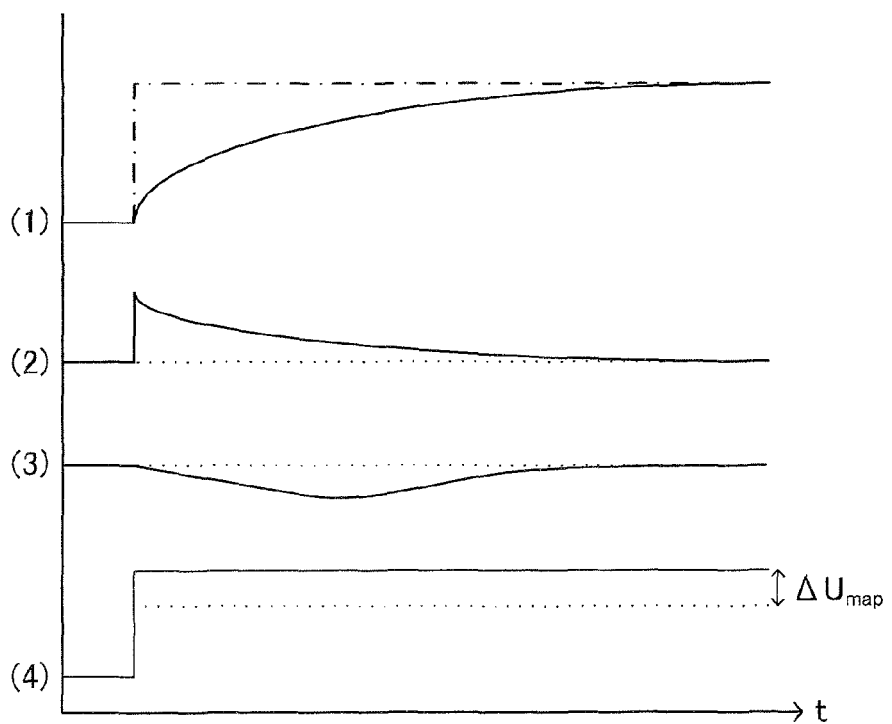

FIG. 3 is a time chart for describing the summary of the operation of this embodiment. In FIG. 3, the abscissa axis shows the time (the elapsed time). In FIG. 3, the solid lines in (1) show actual changes of the controlled object amounts (the turbocharging pressure, etc.) and the chain lines show the target values. The solid lines in (2) show changes of the equivalent control input terms (linear input terms) $U_{eq}$ in the adaptive sliding mode control, the solid lines in (3) show changes of the reaching law input terms (the non-linear input terms) $U_{nl}$, and the solid lines in (4) show the changes of the adaptive law input terms (the adaptive terms) $U_{map}$. (i) shows the changes before the adaptive law input term is learned and (ii) shows the changes after the adaptive law input term is learned. The contents of the adaptive sliding mode control is well known at the time of the filing of this application (for example, refer to the aforementioned publications), however, for confirmation, the summary thereof will be described later.

As shown in (i) of FIG. 3, an offset (refer to $\Delta U_{nl\_ss}$) may be generated in the reaching law input terms $U_{nl}$ due to the individual difference, etc. of the system. This is assumed to be due to the following reasons. In the normal (conventional) adaptive sliding mode control, the adaptive law input term $U_{map}$ is set on the basis of the convergence value of the controlled object amount in the nominal model. Thus, the deviation of the eventual convergence value of the controlled object amount, which is derived from the individual difference, etc. of the system, is absorbed by the adaptive law input term $U_{map}$.

As described above, when the offset occurs in the reaching law input term $U_{nl}$ due to the individual difference, etc. of the system, the convergence property of the controlled object amount on the hyperplane changes, depending on the individual difference, etc. of the system and the reaching law input term $U_{nl}$ operates vibrationally. As a result, as shown in (i) of FIG. 3, the controlled object amount also changes vibrationally.

In this embodiment, the adaptive law input term $U_{map}$ is learned so as to transfer (switch or shift) the offset $\Delta U_{nl\_ss}$ of the reaching law input term $U_{nl}$ to the adaptive law input term $U_{map}$ (refer to the $\Delta U_{map}$ in the figure). Then, as shown in (ii) of FIG. 3, the offset of the reaching law input term $U_{nl}$ is omitted and the operation property of the reaching law input term $U_{nl}$ is stabilized. Thereby, the stable followability of the controlled object amount to the target value can be obtained.

Below, additionally, the adaptive sliding mode control of the EGR rate and the turbocharging pressure will be described (as necessary, refer to, for example, JP Unexamined Patent Publication Nos. 2010-229968, 2010-229974, 2011-111966, etc.)

In this embodiment, it is assumed that a 3 input-2 output feedback control is performed in which the EGR rate $y_1$ and the turbocharging pressure (the pressure in the intake pipe) $y_2$ are the control output variables (the output vector Y) and the opening degree $u_1$ of the EGR valve 52, the opening degree $u_2$ of the nozzle vane 62 of the variable turbocharger and the opening degree $u_3$ of the throttle valve 31 are the control input vector U. As shown by the following state equation (the mathematical expression 1), it should be noted that this embodiment is configured such that the state variable vector X can be realized directly from the output vector Y (that is, the object to be directly controlled is the amount detectable by the various sensors or the like such as the sensors 33 and 34, etc.). Thereby, the state estimation observer is not needed and the decrease of the control property due to the estimated deviation by using this observer can be avoided. The state equation and the output equation are the following equations (the mathematical expression 1).

$$\dot{X} = AX + BU$$

$$Y = CX \qquad \text{[Mathematical Expression 1]}$$

In the aforementioned equations, the matrix C is an already known matrix (in this embodiment, the matrix is the identity matrix). The plant is modeled (the nominal model is identified) as follows. The values of the EGR rate and the turbocharging pressure are observed while manipulating the opening degrees by inputting the M-sequence signals of various frequencies into the EGR valve 52, the nozzle vanes 62 and the throttle valve 31. On the basis of the input and output data in this case, the matrixes A and B in the state equation (the mathematical expression 1) are identified.

In this embodiment, the "nominal model" is the model expressing the behavior of the EGR rate and the turbocharging pressure (the pressure in the intake pipe) when the operation states of the EGR valve 52, the nozzle vanes 62 and the throttle valve 31 are controlled by using the state equation regarding the EGR valve 52, the nozzle vanes 62 and the throttle valve 31. The model, which considers the mutual interference of the controlled amounts, can be structured by making the M-sequence signals, which are input into the EGR valve 52, the vane nozzles 62 and the throttle valve 31, unrelated to each other.

The design procedure of the sliding mode controller in the ECU 7 (refer to FIG. 2: hereinafter, this will be simply referred to as—sliding mode controller—) includes the design of the hyperplane and the design of the non-linear switching input for constraining the state variable on the hyperplane as is well known. When defining a new state variable vector $X_e$ obtained by adding a vector Z to the initial state variable vector X so as to structure a type 1 servo system, an augmented state equation shown by the following equation (the mathematical expression 2) is obtained. The vector Z has the integration values of the deviation between the target value vector R (which has the target value of the EGR rate and the target value of the turbocharging pressure as elements) and the output vector Y as elements. The state variable $x_e = [x_{e1}\ x_{e2}\ x_{e3}\ x_{e4}]^T$ includes the time integrations $x_{e1}, x_{e2}$ of the deviation between the control output Y and the target value R and the control outputs Y itself $x_{e3}, x_{e4}$ as components. The state variable $x_{e3}$ is the EGR rate $y_1$ itself and the state variable $x_{e4}$ is the turbocharging pressure $y_2$ itself.

[Mathematical Expression 2]

$$\dot{X}_e = A_e X + B_e U + E_e R$$

$$\text{where } X_e = \begin{bmatrix} Z \\ X \end{bmatrix}, A_e = \begin{bmatrix} 0 & -C \\ 0 & A \end{bmatrix}, B_e = \begin{bmatrix} 0 \\ B \end{bmatrix}, E_e = \begin{bmatrix} I \\ 0 \end{bmatrix}$$

In consideration of the stability margin, the design technique, which uses a zero point of the system, is used for the design of the hyperplane. That is, the hyperplane is designed so as to stabilize the equivalent control system when the augmented system of the aforementioned equation (the mathematical expression 2) generates the sliding mode. When defining the switching function σ by the following equation (the mathematical expression 3), σ=0 and the following equation (the mathematical expression 4) are established in the case that the state is constrained in the hyperplane.

$$\sigma = S X_e \quad \text{[Mathematical Expression 3]}$$

$$\dot{\sigma} = S \dot{X}_e \quad \text{[Mathematical Expression 4]}$$
$$= S(A_e X_e + B_e U + E_e R)$$
$$= 0$$

Thus, the equivalent control input (the linear input) when the sliding mode occurs is the following equation (the mathematical expression 5).

$$U_{eq} = -(SB_e)^{-1}(SA_e X_e + SE_e R) \quad \text{[Mathematical Expression 5]}$$

When the equivalent control input of the aforementioned equation (the mathematical expression 5) is substituted in the augmented state equation (the mathematical expression 2), the equivalent control system of the following equation (the mathematical expression 6) is obtained.

$$\dot{X}_e = (A_e - B_e(SB_e)^{-1}SA_e)X_e + (E_e - B_e(SB_e)^{-1}SE_e)R \quad \text{[Mathematical Expression 6]}$$

The design of the hyperplane so as to stabilize the equivalent control system and the design of the system ignoring the target value R are equivalent to each other and therefore, the following equation (the mathematical expression 7) is established.

$$\dot{X}_e = (A_e - B_e(SB_e)^{-1}SA_e)X_e \quad \text{[Mathematical Expression 7]}$$

The following equation (the mathematical expression 8) is obtained when obtaining the feedback gain by using the optimal control theory in consideration of the stability ε relative to the aforementioned equation (the mathematical expression 7) and using it as a hyperplane.

$$S = B_e^T P_s \quad \text{[Mathematical Expression 8]}$$

The matrix $P_s$ is the positive definite solution of the following Riccati Equation (the mathematical expression 9).

$$P_s A_e' + A_e'^T P_s P_s B_e R_s^{-1} B_e^T P_s + Q_s = 0$$

$$A_e' = A_e \epsilon I$$

$$Q_s = \text{diag}[q_1, q_2, q_3, q_4]$$

$$R_s = \text{diag}[r_1, r_2, r_3] \quad \text{[Mathematical Expression 9]}$$

In the Riccati Equation (the mathematical expression 9), $Q_s$ is the weighting matrix of the control purpose, which is the negative definite symmetric matrix. $q_1$ and $q_2$ are the weights relative to the integration Z of the deviation and are determined by the difference of the speed of the frequency response of the control system. $q_3$ and $q_4$ are the weights relative to the output Y and are determined by the difference of the magnitude of the gain. $R_s$ is the weighting matrix of the control input, which is the positive definite symmetric matrix. ε is the stability margin coefficient and is specified such that ε≥0.

In place of the aforementioned equations (the mathematical expression 8) and (the mathematical expression 9), the hyperplane structuring equation of the discrete system (the mathematical expression 10) and the algebraic Riccati Equation (the mathematical expression 11) shown below may be used.

$$S = (R_s B_e^T P_s B_e) B_e^T P_s A_e \quad \text{[Mathematical Expression 10]}$$

$$A_e'^T P_s A_e' - P_s - A_e'^T P_s B_e (B_e^T P_s B_e + R_s)^{-1} B_e^T P_s A_e' + Q_s = 0 \quad \text{[Mathematical Expression 11]}$$

The eventual sliding mode controller is used for the design of the input for constraining the state variable in the hyperplane. The control input U is expressed by the following equation (the mathematical expression 12) as the sum of the equivalent control input (the linear input) $U_{eq}$ and the new input, that is, the reaching law input (the non-linear input) $U_{nl}$.

$$U = U_{eq} + U_{nl} \quad \text{[Mathematical Expression 12]}$$
$$= -(SB_e)^{-1}(SA_e X_e + SE_e R) + U_{nl}$$

In order to stabilize the switching function σ, when selecting the following equation (the mathematical expression 13) as the Lyapunov function regarding σ and differentiating the equation, the following equation (the mathematical expression 14) is obtained.

$$V = \frac{1}{2}\sigma^T\sigma \quad \text{[Mathematical Expression 13]}$$

$$\dot{V} = \sigma^T\dot{\sigma} \quad \text{[Mathematical Expression 14]}$$
$$= \sigma^T S(A_e X_e + B_e U + E_e R)$$

When substituting the equation (the mathematical expression 12) in the equation (the mathematical expression 14), the following equation (the mathematical expression 15) is obtained.

$$\dot{V} = \sigma^T(SB_e)U_{nl} \quad \text{[Mathematical Expression 15]}$$

When the reaching law input $U_{nl}$ is the following equation (the mathematical expression 16), the differential of the Lyapunov function is the following equation (the mathematical expression 17).

$$U_{nl} = -(SB_e)^{-1}k\frac{\sigma}{\|\sigma\|} \quad \text{[Mathematical Expression 16]}$$

$$\dot{V} = -k\frac{\sigma^T\sigma}{\|\sigma\|} \quad \text{[Mathematical Expression 17]}$$

Therefore, when setting the switching gain k as a positive value, the differential of the Lyapunov function becomes negative and therefore, the stability of the sliding mode is ensured.

When replacing the switching gain k in the equation (the mathematical expression 16) with the following equation (the mathematical expression 18), the reaching law input $U_{nl}$ is the following equation (the mathematical expression 19).

$$k = J\|\sigma\| \quad \text{[Mathematical Expression 18]}$$

$$U_{nl} = -(SB_e)^{-1}J\sigma \quad \text{[Mathematical Expression 19]}$$

The non-linear gain J is obtained by multiplying the vector factor $J_k$ by the scalar factor k as shown by the following equation (the mathematical expression 20).

$$J = kJ_k \quad \text{[Mathematical Expression 20]}$$

The vector $J_k[j_{k1}, j_{k2}, j_{k3}]^T$ in the equation (the mathematical expression 20) is determined on the basis of the input-output property between each of the opening degree $u_1$ of the EGR valve 52, the opening degree $u_2$ of the nozzle vane 62 and the opening degree $u_3$ of the throttle valve 31 and each of the EGR rate $y_1$ and the turbocharger pressure $y_2$. The change amount of the EGR rate $y_1$ and the turbocharger pressure $y_2$ when the opening degree $u_1$ of the EGR valve 52, the opening degree $u_2$ of the nozzle vane 62 and the opening degree $u_3$ of the throttle valve 31 change by an unit amount (typically, by the opening degree value 1 percent) can be realized by observing the step response of each of the control outputs $y_1$ and $y_2$ relative to each of the control inputs $u_1$, $u_2$ and $u_3$.

It is preferred that Jk is determined such that the contribution of the EGR valve 52, the nozzle vane 62 and the throttle valve 31 relative to the control outputs $y_1$ and $y_2$ in the step response is equalized. That is, the sensitivity of the control outputs $y_1$ and $y_2$ relative to the opening degree change of the EGR valve 52 is relatively small (the control outputs $y_1$ and $y_2$ do not change much even by manipulating the EGR valve 52) and therefore, the gain $J_{k1}$, which is to be multiplied for calculating the reaching law input value $u_{nl1}$ relating to the EGR valve 52, is set as the relatively large value. On the other hand, the sensitivity of the control outputs $y_1$ and $y_2$ relative to the opening degree change of the vane nozzle 62 is relatively large (the control outputs $y_1$ and $y_2$ change more than a little by manipulating the nozzle vane 62) and therefore, the gain $J_{k2}$, which is to be multiplied for calculating the reaching law input value $u_{nl2}$ relating to the nozzle vane 62 is set as the relatively small value.

The vector $J_k$ is, for example, determined as $J_k = [2.18, 0.68, 1]^T$. This exemplary value $J_k$ means that it can be considered that in the step response, the change amount of the control inputs $y_1$ and $y_2$ generated when the opening degree $u_1$ of the EGR valve 52 is changed by 2.18 percent, the change amount of the control inputs $y_1$ and $y_2$ generated when the opening degree $u_2$ of the nozzle vane 62 is changed by 0.68 percent and the control inputs $y_1$ and $y_2$ generated when the opening degree $u_3$ of the throttle valve 31 is changed by 1 percent are generally equal to each other.

The scalar k in the equation (the mathematical expression 20) is the adaptation coefficient and is determined appropriately by the adaptation when the sliding mode controller is designed.

Therefore, the control input U calculated by the sliding mode controller is the following equation (the mathematical expression 21).

$$U = -(SB_e)^{-1}(SA_e X_e + SE_e R + J\sigma) \quad \text{[Mathematical Expression 21]}$$

In the 3 input-2 output system as this embodiment, it is established that $\det(SB_e) = 0$ and therefore, the matrix $(SB_e)$ does not become non-singular. Therefore, the inverse matrix $(SB_e)^{-1}$ is calculated as the generalized inverse matrix. In the generalized inverse matrix, for example, the Moore Penrose type inverse matrix $(SB_e)^+$ is used.

The correction term $U_{map}$ is taken into account in connection with the control input U (the mathematical expression 25), which is the sum of the equivalent control input $U_{eq}$ and the reaching law input $U_{nl}$. In the design of the sliding mode controller, as described above, the nominal model (the matrixes A and B) of the internal combustion engine system 1 under a particular operation area, that is, under a particular engine speed and required fuel injection amount is identified to obtain the aforementioned state equation (the mathematical expression 2) and the switching hyperplane S is introduced. The modelling error (perturbation) between the nominal model and the actual plant expands at the area distant from the nominal point (at the low engine speed and load area or at the high engine speed and load area, etc.). The correction term $U_{map}$ is the adaptive law input term (the map term) for decreasing this modeling error to immediately converge the reaching law input (the non-linear input) $U_{nl}$ on 0.

The initial value of the $U_{map}$ map (the value before the aforementioned learning of the characteristics of this invention is performed) is prepared as follows: the target EGR rate and the target turbocharging pressure suitable (or typical) for each operation area [the engine speed, the required fuel injection amount] are determined and the manipulated amount $U_{base}$ of each manipulated part (the EGR valve 52, the nozzle vane 62 and the throttle valve 31) under the stationary state for accomplishing the targets in the real internal combustion engine system 1 is measured. In addition, the linear input $U_{eq}$ under the stationary state having no deviation is calculated by supplying the same target to the sliding mode controller. The map term $U_{map} = U_{base} - U_{eq}$ corresponding to each operation area [the engine speed, the required fuel injection amount] is obtained by subtracting the calculated value $U_{eq}$ of the linear input by the sliding mode controller from the actual value $U_{base}$ of the manipulation amount (the opening degree) of each manipulated part of the real system.

The map data showing the adaptive law input term $U_{map}$ to be set, depending on the engine speed and the required fuel injection amount is previously stored in the flash memory of the ECU 7. The ECU 7 acquires the adaptive law input term $U_{map}$ by searching the map by using the engine speed and the required fuel injection amount as the key and then, adds this value $U_{map}$ to the control input U (the equivalent control input $U_{eq}$ and the reaching law input $U_{nl}$) calculated by the sliding mode controller. Eventually, the control input U supplied to each manipulated part (the EGR valve 52, the nozzle vane 62 and the throttle valve 31) is the following equation (the mathematical expression 22) obtained by adding the adaptive law input term $U_{map}$ to the equation (the mathematical expression 21).

$$U = -(SB_e)^{-1}(SA_eX_e + SE_eR + J\sigma) + U_{map}$$  [Mathematical Expression 22]

[Concrete Example of Operation]

Figure 4:
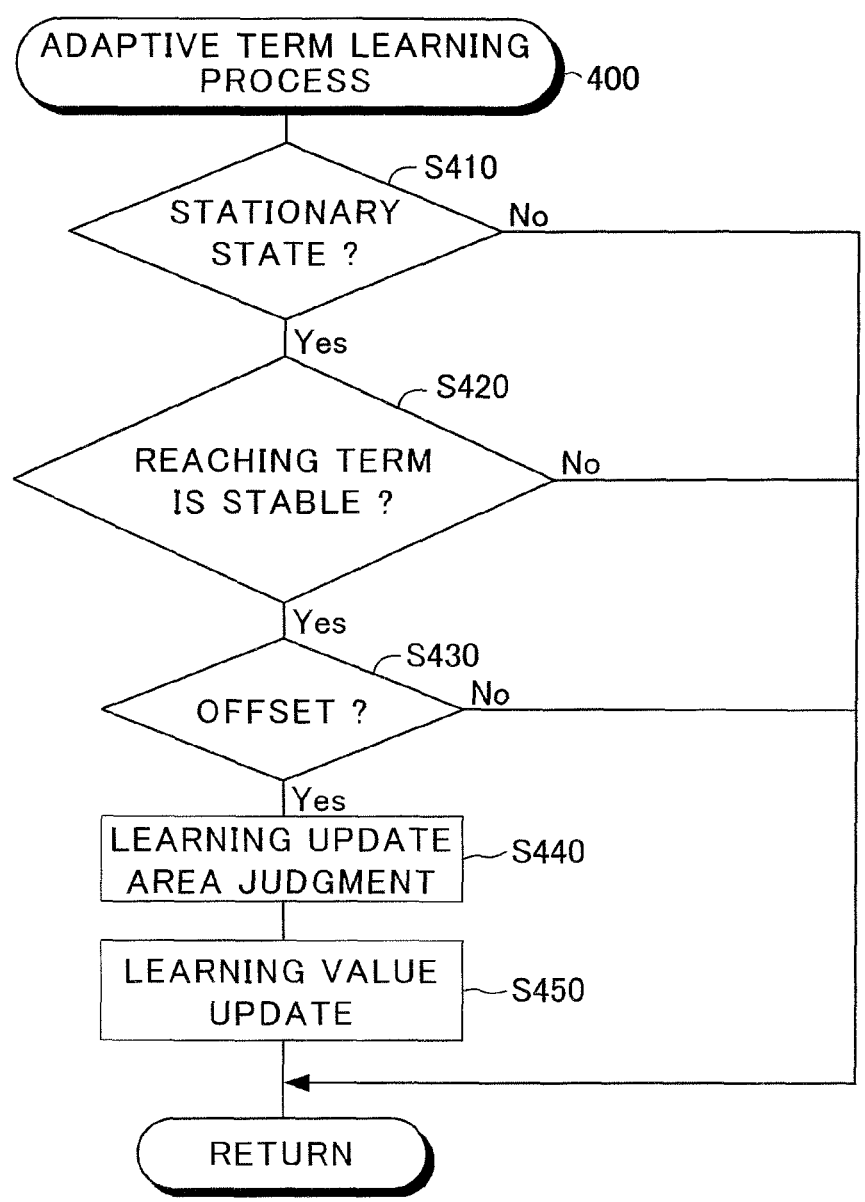
FIG. 4 is a flowchart showing an example of a process performed by the control unit shown in FIGS. 1 and 2.

FIG. 4 is a flowchart showing an example of the process performed by the control unit 7 shown in FIGS. 1 and 2. Below, one concrete example of the learning process of the adaptive law input term (the adaptive term) $U_{map}$ of this embodiment will be described by using the flowchart. In the flowchart shown in FIG. 4, the "step" is expressed by "S" (this applies to the modified example described later shown in FIG. 5).

The CPU provided in the ECU 7 (hereinafter, this will be simply referred to as—CPU—) initiates the adaptive term learning process routine 400 shown in FIG. 4 every a predetermine time. When this routine 400 is initiated, the CPU judges whether the present operation state is the stationary state on the basis of the aforementioned various parameters, the change amount of the manipulation amount of each manipulated part and the convergence degree of the state variable to the target value at the step 410. When the present operation state is not the stationary state (the step 410=No), the processes of the step 420 and the subsequent steps are skipped and this routine ends. Therefore, the following description describes the case that the present operation state is the stationary state (the step 410=Yes).

Next, the process proceeds to the step 420 and the CPU judges whether the value of the reaching law input term (the reaching term) $U_{nl}$ is stable (that is, whether the fluctuation range is within a predetermined range). When the value of the reaching law input term $U_{nl}$ is stable (the step 420=Yes), the process proceeds to the step 430 and the subsequent steps and on the other hand, when the value of the reaching law input term $U_{nl}$ is not stable (the step 420=No), the processes of the step 430 and the subsequent steps are skipped (that is, the learning of the adaptive law input term $U_{map}$ is skipped this time) and this routine ends.

When the process proceeds to the step 430, the CPU judges whether the offset (refer to $\Delta U_{nl\_ss}$ in FIG. 3) occurs in the reaching law input term $U_{nl}$. When the offset occurs in the reaching law input term $U_{nl}$ (the step 430=Yes), the process proceeds to the steps 440 and 450 and the adaptive law input term $U_{map}$ corresponding to the operation state is learned and thereafter, this routine ends. When this learning is performed, at the step 440, the CPU judges the present operation area [the engine speed, the required fuel injection amount]. Then, at the step 450, the CPU updates the value corresponding to the present operation area in the map of the adaptive law input term $U_{map}$. On the other hand, when the offset does not occur in the reaching law input term $U_{nl}$ (the step 430=No), the processes of the steps 440 and 450 are skipped (that is, the update of the value corresponding to the present operation area in the map of the adaptive law input term $U_{map}$ is not performed this time) and then, this routine ends.

[Illustrative Recitation of Modified Example]

The aforementioned embodiment is simply the typical embodiment of this invention, which the applicant considered best at the filing of this application. Thus, the invention is not limited to the aforementioned embodiment. Therefore, naturally, the various modification may be applied to the aforementioned embodiment without changing the essential portion of this invention.

Below, the several typical modified examples will be described. However, the modified example is not limited to those described below. The modified examples may be appropriately combined with each other without the technical inconsistent.

This invention (in particular, the matter described operationally or functionally of each constitution element for constituting means of this invention for solving the problem) should not be limited to the aforementioned embodiment and the modified examples described below. Such a limitation is not allowed, since the benefit of the applicant (in particular, who is hurry to file the application under the first-file-rule) is unfairly impaired and the imitator obtains unfairly a benefit.

This invention is not limited to the concrete device constitution described in the aforementioned embodiment. That is, the application object of this invention is not limited to the internal combustion engine system. In particular, for example, in the case that this invention is applied to the vehicle, this invention can be appropriately applied to the braking control, etc. in the vehicle having no internal combustion engine (the fuel cell vehicle, the electric vehicle, etc.).

In the case that this invention is applied to the internal combustion engine system (including the so-called "hybrid vehicle" provided with the driving source such as the electric motor, etc. in addition to the internal combustion engine), this invention can be appropriately applied to the system provided with, for example, the gasoline engine, the diesel engine, the methanol engine, the bioethanol engine and the other optional type of the internal combustion engine. The cylinder number, the cylinder arrangement type (linear type, V-type, horizontally-opposed type), the fuel supplying type, the ignition type and the turbocharging type are not limited to any particular type.

This invention is not limited to the concrete processing manner described in the aforementioned embodiment. For example, in the aforementioned concrete example, the acceleration pedal manipulation amount, the intake air flow rate, etc. may be used as the engine load for defining the operation area in place of the required fuel injection amount.

As a method for transferring the offset $\Delta U_{nl\_ss}$ of the reaching law input term $U_{nl}$ to the adaptive law input term $U_{map}$, other than the method for transferring the generated offset $\Delta U_{nl\_ss}$ to the adaptive law input term $U_{map}$ at once, any optional method such as a method using a first order smoothing, etc. can be used.

In the control of the actual internal combustion engine system 1, even if the operation area [the engine speed, the required fuel injection amount] is the same, the target value to be accomplished (the target EGR rate or the target turbocharging pressure) may differ. Thus, it is considered that the optimal adaptive law input term $U_{map}$ changes in the case that the target in the actual control is different from the target determined when the map is prepared. Therefore, it is preferred that the environmental correction is added to the adaptive law input term $U_{map}$ acquired by referring to the map. The environmental correction corrects the adaptive law input term $U_{map}$, depending on the parameter (the cooling water temperature, the intake air temperature, the ambient temperature, the atmosphere pressure, etc.) for correcting the base value of the target value.

In particular, for example, the value, which is obtained by multiplying the adaptive law input term $U_{map}$ read from the map prepared on the basis of the predetermined standard environmental state (hereinafter, will be referred to as—base state—) by the correction coefficient (for example, the target EGR rate correction coefficient) by the aforementioned parameter, may used as the corrected adaptive law input term $U_{map}$. In this case, all aforementioned correction coefficients may be used for the multiplication or only the representative value (the maximum value or the minimum value) may be used.

The map of the adaptive law input term $U_{map}$ every the parameter may be prepared and the degree of the transfer of the offset $\Delta U_{nl\_ss}$ of the reaching law input term $U_{nl}$ to the respective map may be appropriately adjusted, depending on the ratio of the correction coefficients (the amount of the transfer may be distributed, depending on the ratio of the correction coefficients). In this case, in particular, for example, in the case that the cooling water temperature correction value relative to the target EGR rate is 0.4, the ambient temperature correction value relative to the target EGR rate is 0.8 and the ambient pressure correction value relative to the target EGR rate is 0.9, the offset $\Delta U_{nl\_ss}$ of the reaching law input term $U_{nl}$ is transferred to the adaptive law input term learning map for base cooling water temperature, the adaptive law input term learning map for the base ambient temperature and the adaptive law input term learning map for the base ambient pressure under the ratio such as (1-0.4):(1-0.8):(1-0.9)=6:2:1, which is the ratio of the deviations relative to the base state (1.0). Thereby, the high followability of the state variable to the target value can be obtained.

Figure 5:
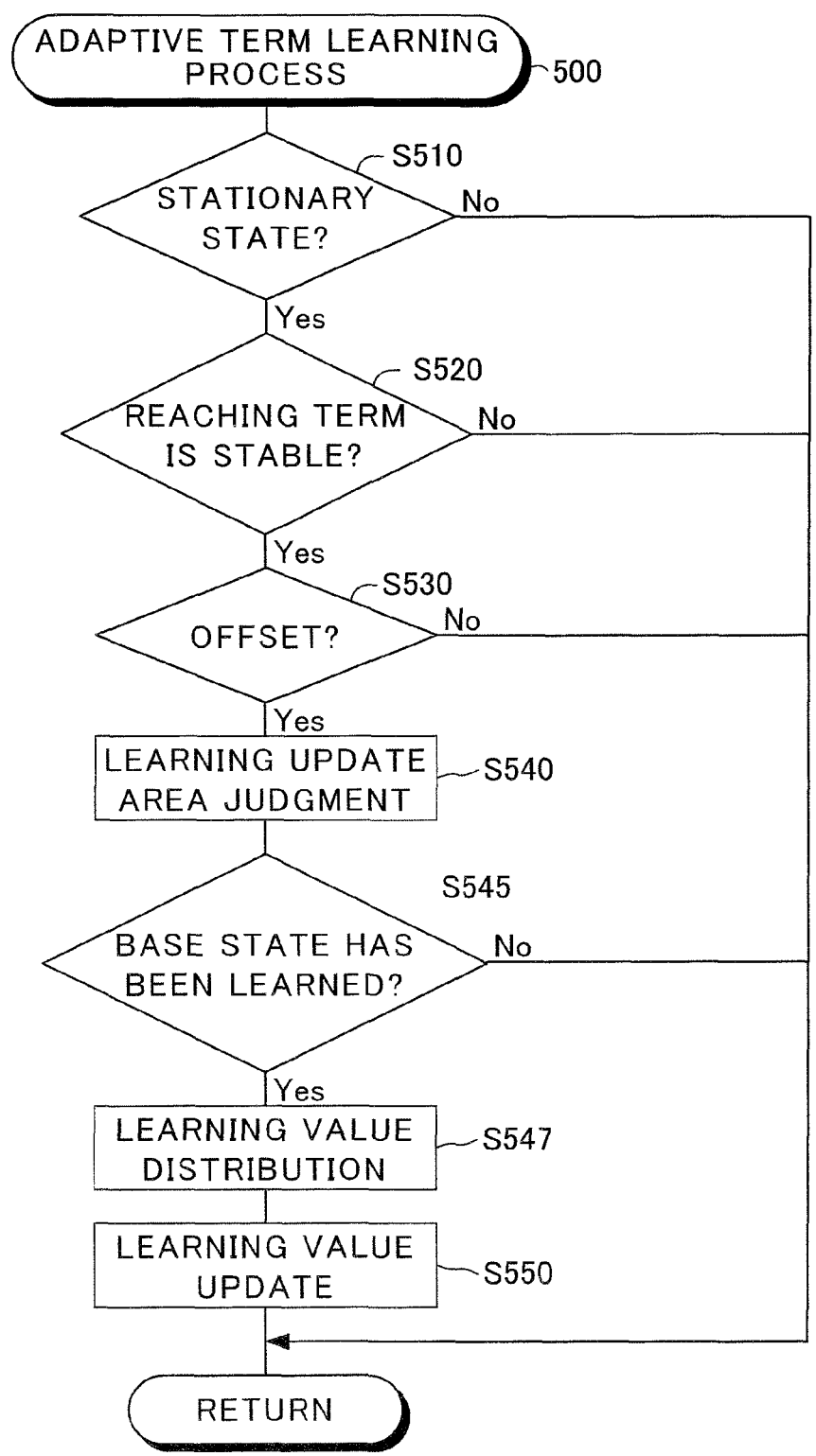
FIG. 5 is a flowchart showing another example of a process performed by the control unit shown in FIGS. 1 and 2.

FIG. 5 is a flowchart corresponding to the modified example. The steps 510 to 530 in the routine 500 of this modified example are the same as the steps 410 to 440 in the routine 400 of the aforementioned concrete example. That is, in the case that the present operation state is the stationary state (the step 510=Yes), the value of the reaching law input term $U_{nl}$ is stable (the step 520=Yes) and the offset occurs in the reaching law input term $U_{nl}$ (the step 530=Yes), the process proceeds to the step 540 and the subsequent steps and the adaptive law input term maps $U_{map\_Tw}$, $U_{map\_Tair}$ and $U_{map\_Pa}$ provided corresponding to the cooling water temperature (Tw), the ambient temperature (Tair) and the ambient pressure (Pa) is learned, corresponding to the engine area [the engine speed, the required fuel injection amount].

In particular, at first, the CPU judges the present operation area [the engine speed, the required fuel injection amount] at the step 540. Next, the CPU judges whether the adaptive law input term map has been learned at all operation areas under the base state at the step 545. When the learning has not been completed (the step 545=No), the processes of the steps after this step are skipped (that is, the learning is skipped this time) and then, this routine ends. On the other hand, when the adaptive law input term map has been learned at all operation areas under the base state (the step 545=Yes), the process proceeds to the step 547.

At the step 547, the learned values $\Delta U_{map\_Tw}$, $\Delta U_{map\_Tair}$ and $\Delta U_{map\_Pa}$ for transferring the offset $\Delta U_{nl\_ss}$ of the reaching law input term $U_{nl}$ to the adaptive law input term maps $U_{map\_Tw}$, $U_{map\_Tair}$ and $U_{map\_Pa}$ are distributed, corresponding to the correction coefficients $K_{Tw}$, $K_{Tair}$ and $K_{Pa}$ of the target EGR rate. That is, for example, in the case that the cooling water temperature correction coefficient $K_{Tw}$ relative to the target EGR rate is 0.4, the ambient temperature correction coefficient $K_{Tair}$ relative to the target EGR rate is 0.8 and the ambient pressure correction coefficient $K_{Pa}$ relative to the target EGR rate is 0.9, the learned values $\Delta U_{map\_Tw}$, $\Delta U_{map\_Tair}$ and $\Delta U_{map\_Pa}$ are set such that $\Delta U_{map\_Tw}:\Delta U_{map\_Tair}:\Delta U_{map\_Pa}=(1-0.4):(1-0.8):(1-0.9)=6:2:1$. Thereafter, at the step 547, the learned values in the adaptive law input term maps $U_{map\_Tw}$, $U_{map\_Tair}$ and $U_{map\_Pa}$ are updated by $\Delta U_{map\_Tw}$, $\Delta U_{map\_Tair}$ and $\Delta U_{map\_Pa}$ and then, this routine ends.

In the aforementioned modified example, the step 545 can be omitted. As the correction value, other than the EGR correction value, the turbocharging pressure correction value (refer to the JP Unexamined Patent Publication No. 2005-248910, etc.) may be used.

Another modified example not described herein is within the scope of this invention without changing the essential portion of this invention.

The element described operationally or functionally in each element, which constitutes mean of this invention for solving the problem, includes the concrete arrangement described in the aforementioned embodiment and the modified example and any arrangement which can accomplish the operation or the function thereof. The contents of the Publications (including the specification and the drawings) recited using the publication numbers or the publication name in this specification is incorporated by reference as a part of this specification without the technical inconsistent.

The invention claimed is:

1. A sliding mode controller applied to a controlled object system including at least one controlled object,
   the sliding mode controller comprising:
   an electronic control unit configured to control the controlled object system by an adaptive sliding mode control including a linear input term, a non-linear input term, and an adaptive term;
   means configured to acquire an operation state of the controlled object system; and
   means configured to control the operation state of the controlled object system,
   wherein the electronic control unit is configured to:
   learn the adaptive term by adding one of a value of the non-linear input term and a predetermined proportion of the value of the non-linear input term to the adaptive term when the operation state of the controlled object system changes from a transient state to a stationary state;
   correct the non-linear input term by subtracting the value added to the adaptive term from the non-linear input term; and
   control the controlled object system by the adaptive sliding mode control using the learned adaptive term and the corrected non-linear input term.

2. The sliding mode controller of the claim 1, wherein the electronic control unit is configured to learn the adaptive term of every operation area of the controlled object system.

3. The sliding mode controller of the claim 2, wherein the electronic control unit has maps of the adaptive terms, the maps corresponding to each of state parameters, each of state parameters representing a state of the controlled object system and being different from an operation state parameter defining the operation area, and the electronic control unit is configured to learn the adaptive term of each of the maps every operation area of the controlled object system.

4. The sliding mode controller of the claim 3, wherein the electronic control unit is configured to:
correct a target value of a controlled amount of the controlled object system by correction values determined on the basis of the state parameters, respectively;
control the controlled amount to the corrected target value by the adaptive sliding mode control; and
learn the adaptive term by adding one of the value of the non-linear input term and the predetermined proportion of the value of the non-linear input term to the adaptive term when the operation state of the controlled object system changes from the transient state to the stationary state, the value added to the adaptive term being a value depending on the correction values.

5. The sliding mode controller of the claim 1, wherein the controlled object system is an internal combustion engine system including an internal combustion engine and devices installed on the internal combustion engine.

\* \* \* \* \*